United States Patent [19]

Wolinski et al.

[11] 4,155,950

[45] May 22, 1979

[54] NON TOXIC ACTIVATORS FOR ADHESIVE COMPOSITIONS

[75] Inventors: Leon E. Wolinski, Cheektowaga; Peter D. Berezuk, Kenmore, both of N.Y.

[73] Assignee: Pratt & Lambert, Inc., Buffalo, N.Y.

[21] Appl. No.: 858,702

[22] Filed: Dec. 8, 1977

Related U.S. Application Data

[63] Continuation-in-part of Ser. No. 705,333, Jul. 14, 1976, Pat. No. 4,080,238, and a continuation-in-part of Ser. No. 763,145, Jan. 27, 1977.

[51] Int. Cl.² ............................................ C08F 283/04
[52] U.S. Cl. ................................. 260/859 R; 156/331; 260/837 R; 260/879; 526/216
[58] Field of Search ................ 260/859 R, 879, 837 R, 260/836; 526/216, 217

[56] References Cited

U.S. PATENT DOCUMENTS

| | | | |
|---|---|---|---|
| 2,558,139 | 6/1951 | Knock | 526/217 |
| 3,740,850 | 6/1973 | Bowen | 260/837 R |
| 3,870,675 | 3/1975 | Kusayama | 260/879 |
| 3,873,640 | 3/1975 | Owston | 260/859 R |
| 3,994,764 | 11/1976 | Wolinski | 428/416 |
| 3,996,308 | 12/1976 | Douek | 260/859 R |

*Primary Examiner*—Paul R. Michl
*Attorney, Agent, or Firm*—Christel, Bean & Linihan

[57] ABSTRACT

Non-toxic tertiary amines having very low vapor pressures and substantially insolubility in water and fats are employed as free radical catalyst activators for adhesive compositions comprising polyurethane polymers or elastomers dissolved in an addition polymerizable combination of an acrylic or methacrylic monomer, a copolymerizable monomer containing a free carboxylic acid group and a non-activated free radical polymerization catalyst.

11 Claims, No Drawings

NON TOXIC ACTIVATORS FOR ADHESIVE COMPOSITIONS

CROSS REFERENCE TO RELATED APPLICATIONS

This application is related to U.S. Pat. No. 3,994,764 and is a continuation-in-part of copending applications Ser. No. 705,333 filed July 14, 1976, now U.S. Pat. No. 4,080,238 and Ser. No. 763,145 of Wolinski et al filed Jan. 27, 1977 all assigned to the same assignee as the present application and which are hereby incorporated by reference.

BACKGROUND OF THE INVENTION

In U.S. Pat. No. 3,994,764 and the above mentioned copending applications there are disclosed activatable curable adhesive compositions comprising a non-reactive polyurethane polymer or a non-reactive elastomer dissolved in a free radical addition polymerizable methacrylic or acrylic monomer and a free radical addition polymerizable acid monomer co-polymerizable with the methacrylic or acrylic monomer. The solution contains a non-activated free radical polymerization catalyst.

The patent and applications referred to show thermoplastic polyurethane resin and elastomers such as acrylonitrile-butadiene rubbers as the non-reactive polymers, alkyl acrylate and methacrylate esters as the polymerizable acrylic monomers, acrylic and methacrylic acid monomers, with benzoyl peroxide as the catalyst.

As activators there are disclosed dimethylaniline, diethylaniline, N,N-dimethyl-p-toluidine. These may be admixed with an accelerator such as a salt of copper, iron, cobalt manganese or lead, and may be dissolved in a suitable solvent.

Increased heat resistance may be imparted to the adhesive by the addition of a relatively small percentage of a non-reactive epoxy resin.

In one method of use, the activator composition is placed on one mating surface and the adhesive composition is placed on another mating surface. Both surfaces are then brought together and maintained in contact relationship until the adhesive cures to a set.

Alternatively, the activator (and accelerator, if present) may be encapsulated in a microsphere which is insoluble in the adhesive composition. On rupturing the microsphere the adhesive will cure to a set. In one embodiment the adhesive composition is coated on one or both mating surfaces. These are then brought into contact with sufficient pressure to rupture the microspheres. Thereafter, the surfaces are held in contact relationship until the adhesive cures to a set. In another method, the microspheres are ruptured in the adhesive solution which is then applied to at least one of the mating surfaces and both surfaces are thereafter brought into contact. The microsphere-containing adhesive is disclosed in detail in our copending applications Ser. No. 705,333, now U.S. Pat. No. 4,080,238 and Ser. No. 763,145.

While the adhesive compositions and methods for using them are highly satisfactory and give excellent results, care must be used in employing the tertiary amine activators disclosed since these are irritating to the skin and may give toxic reactions.

SUMMARY OF THE INVENTION

We have now discovered that these drawbacks may be substantially eliminated by employing as activators tertiary amine compounds which are essentially insoluble in water and fats, are soluble in the adhesive composition or solution, and which have a very low vapor pressure at ordinary temperatures. These physical properties result in compounds which are substantially non-irritating and non-toxic although skin irritation may occur on contact in the case of some sensitive individuals. In addition, the low vapor pressures enable these activators to be coated on a surface and retain their activity for a long time. Thus, a surface can be pre-coated with the activator and stored until it is desired to join it to another surface. At that time one or both surfaces are coated with the adhesive solution and maintained in contact until set is obtained.

It is the main object of this invention to have a non-toxic tertiary amine compound as the activator for peroxy catalysts employed in a free radical polymerizable adhesive composition.

It is a further object of this invention to employ as the tertiary amine activators reaction products of N-methyl aniline with epoxy compounds.

It is a further object of this invention to provide tertiary amine activators having very low vapor pressures and to coat a surface with such activators.

Further objects of this invention will become apparent from the specification and claims set forth herein after.

DESCRIPTION OF THE PREFERRED EMBODIMENTS

The following non-toxic activators have been prepared.

EXAMPLE 1

A one-liter reaction flask equipped with a mechanical stirrer and reflux condenser was loaded with 2.1 moles of glycidyl methacrylate (297.5 grams), two moles of N-methyl aniline (214 grams) and 100 parts per million of hydroquinone (0.05 grams). The reaction mixture was heated for a total of 24 hours at 98° C. with agitation. Air was maintained over the reaction at all times to prevent premature polymerization. The product, N-phenyl-N-methyl-amino-2-hydroxy propyl methacrylate, $CH_2=C(CH_3)COOCH_2CHOHCH_2N(CH_3)C_6H_5$, is a light green liquid with a refractive index of 1.5418, a vapor pressure of 2 mm at 162°–165° C. and of less than 0.05 mm at room temperature. The material was applied to a clean steel panel and the adhesive base of Example 1 of patent application Ser. No. 763,145 was applied to a second panel. The two were then brought together and allowed to set. Setting time was 10 to 12 minutes at room temperature. The bond strength in shear was 2400 lbs. per square inch and peel strength was 25 lbs. per lineal inch. Thus, an acceptable curing rate was obtained.

EXAMPLE 2

A polymer was prepared from the tertiary amine compound of the previous Example by dissolving it in toluene to form a 20% by weight solution and adding 8% by weight of benzoyl peroxide based on the monomer. The solution was maintained at 80° C. overnight under an atmosphere of nitrogen. The resultant solid polymer (in toluene solution) and the adhesive base were applied to a steel panel as in the previous Example. Setting time was 10 to 12 minutes with bond peel values of 25 lbs. per linear inch and shear values of 2500 lbs per square inch.

EXAMPLE 3

Under conditions similar to Example 2 copolymers of the tertiary amine compound of Example 1 were made with methyl methacrylate methyl acrylate, butyl acrylate and 2-ethyl hexyl acrylate respectively, in varying ratios. It was found that the activity decreased as the amount of the amine employed decreased.

Copolymers which formed very tough films and are useful as activators resulted when the amine content was at least 25% by weight. With methyl acrylate, 2-ethyl hexyl acrylate and butyl acrylate the films produced were more elastomeric than the homopolymer of Example 2, or the copolymers with methyl methacrylate.

The homopolymer and copolymers of Examples 2 and 3 are solids insoluble in water and fats and have substantially no vapor pressure at ordinary temperatures. Accordingly, they are considered to be non-toxic.

EXAMPLE 4

This example describes activators prepared from a wide variety of mono and dioxirane epoxy polymers and N-methyl aniline. The epoxy polymers were reacted with the amine in the ratio of one mole of N-methyl aniline with one equivalent weight each oxirane group in the respective polymer. Listed in the following table are the epoxies employed, their source, and the oxirane equivalent weight, i.e. the grams of epoxy used per 107 grams of N-methyl aniline.

| Class of Epoxy | Specific Polymer | Source | Oxirane equivalent weight; grams of epoxy used with equivalent weight (107 grams) of N-methylaniline |
|---|---|---|---|
| Novolac glycidyl ethers | DEN 431 | Dow Chemical | 179 |
|  | EPN 1138 | Ciba Geigy | 181 |
| Cycloaliphatic epoxides | ERL 4221 | Union Carbide | 140 |
|  | ERL 4289 | " | 210 |
|  | CY 178 | Ciba Geigy | 213 |
|  | CY 179 | " | 140 |
| Glycidyl ethers of polyols | DER 736 | Dow Chemical | 200 |
|  | Epon 812 | Shell Chemical | 160 |
|  | Epon 828 | " | 195 |
|  | Epon 1001 | " | 500 |
|  | Epon 1007 | " | 2500 |
|  | Araldite 508 | Ciba Geigy | 455 |
| Glycidy ethers of alcohols, polyols and phenols | Araldite RD-1 | Ciba Geigy | 148 |
|  | Araldite RD-2 | " | 134 |
|  | Araldite DY 023 | " |  |
|  | Epoxide 7 | Proctor & Gamble | 227 |
| Alpha-Olefin epoxides | Vikolox 10 | Viking Chemical Co | 156 |
|  | Vikolox 11-14 | " | 192 |

The epoxy compounds were reacted with N-methyl aniline in a procedure similar to that in Example 1. A one liter flask was charged with a molar quantity of N-methyl aniline per mole of active oxirane, as listed in the table. Hydroquinone on the order of 100 ppm was added to the mixture which was heated at 100° C. for 24 hours. In addition to the mono and di-functional epoxy polymers shown in the table, tri-functional epoxies may be employed as well.

The activators produced were thick viscous resins and were tested in the manner set forth in Example 1. Setting-up time was in the range of 10 to 18 minutes, peel strength of the bond averaged 20 to 25 lbs. per linear inch and the sheer strength averaged 2300 to 2500 lbs. per square inch.

The vapor pressures of the products of the secondary amines with the oxirane compounds described above are all less than 0.05 mm at room temperature. Many of the activator compounds described are solids, as for example, 4,4'-methylene bis (N,N dimethylaniline) and the copolymers of Example 3. Such solid state coupled with the low vapor pressure and water and fat insolubility lessens even further the possibility of absorbtion through the skin.

While about a 1:1 amino:oxirane group ratio is preferably employed with the mono amines and the mono, di and tri functional epoxies, and with diamines and mono epoxies, the ratio in these cases may be as low as 0.25:1. However, with diamines and di and tri epoxies the 1:1 ratio results in highly cross-linked compounds which are not soluble in the adhesive systems and hence are not suitable as activators. To obtain useful, soluble products in the latter case, a ratio of amino oxirane of about 0.25:1 is employed.

Although all the examples employ N-methyl aniline, which results in the amine moiety

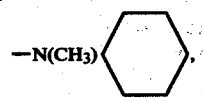

other secondary amines, as illustrated in the following table, may be substituted.

| Compound | Resulting Amino Moiety |
|---|---|
| N-methyl-p-toluidine | $-N(CH_3)\langle\bigcirc\rangle CH_3$ |
| N-β-hydroxy ethyl aniline | $-N(C_2H_4OH)\langle\bigcirc\rangle$ |
| N-ethyl aniline | $-N(C_2H_5)\langle\bigcirc\rangle$ |
| N-n-proply aniline | $-N(C_3H_{7n})\langle\bigcirc\rangle$ |

-continued

| Compound | Resulting Amino Moiety |
|---|---|
| N-β-hydroxy ethyl-p-toluidine | —N(C₂H₄OH)─⟨phenyl⟩ |
| Diethanol amine | —N(C₂H₄OH)₂ |
| Dihyxyl amine | —N(C₆H₁₃)₂ |
| p-chloro-N-methylaniline | —N(CH₃)─⟨phenyl⟩—Cl |
| N,N'-dimethyl-p-phenylene diamine | —N(CH₃)─⟨phenyl⟩—N(CH₃)(H) |
| N,N'-di-2-naphthyl-p-phenylene diamine | —N(naphthyl)─⟨phenyl⟩—N(H)(naphthyl) |
| N-methyl-3,5-xylidene | —N(CH₃)─⟨xylyl with 2 CH₃⟩ |

Most of these compounds are aromatic amines since aromatic ring group acts to increase the electron density on the nitrogen atom which is necessary to activate the peroxy catalyst. The two non-aromatic amines shown, diethanol amine and dihexylamine, have the ability to likewise activate the peroxy catalysts, but at a slower rate.

EXAMPLE 5

The following solid, water insoluble, fat insoluble amines, having vapor pressures of less than 0.05 mm. at room temperature, were dissolved in a suitable solvent such as a chlorinated hydrocarbon and employed as activators in an adhesive composition as described in example 1 tested on a steel panel as shown therein. The compounds have the composition

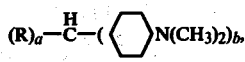

where R is H or phenyl a=o or 1, a+b=3, and when R is phenyl, a is 1.

| Activator | Set Time Minutes | Bond Strength Shear, psi | Peel Strength pl |
|---|---|---|---|
| 4,4'-methylene bis (N,N-dimethyl-aniline) | 4 | 2700–3000 | 47–57 |
| 4,4'4'' methylene tris (N,N-dimethyl-aniline) | 2 | 2000–2500 | 47–57 |
| p,p'-benzylidene bis (N,N-dimethyl-aniline) | 2 | 2200–2500 | 50–60 |

Where the activator is a solid or a viscous resin solution, a suitable solvent such as a chlorinated hydrocarbon is generally required in order to incorporate the activator in the adhesive composition.

EXAMPLE 6

When employing the microsphere technique following the teachings of applications Ser. No. 705,333 and Ser. No. 763,145 the activator, such as set forth in Examples 1–5, dissolved in a suitable solvent if required, is encapsulated in a microsphere having shell or wall composition which is insoluble in the activator composition and in the activatable adhesive. Chlorinated hydrocarbons solvents, which have a high density, are especially useful, since by their use it is possible to adjust the density of the microspheres so that they are non-floating in the adhesive composition.

On rupturing the microspheres, either prior or subsequent to coating on one or both mating surfaces, the adhesive becomes activated. Thereafter, on bringing the surfaces into contact, the adhesive sets and cures to a stong adhesive bond.

What is claimed is;

1. In an activatable curable adhesive comprising a non-reactive thermoplastic polyurethane resin or a non-reactive elastomer dissolved in a non-acid methacrylic or acrylic monomer and a methacrylic or acrylic acid monomer, said monomers being essentially devoid of peroxy catalyst activation capability, said solution containing an effective amount of a peroxy catalyst, the said adhesive being activatable by contact with a peroxy catalyst activator; the improvement comprising having in addition in said adhesive an activator soluble in the adhesive solution, to activate the peroxy catalyst said activator being selected from the group consisting of:

a.

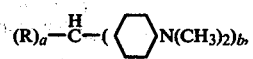

R=H or phenyl, a=0 or 1, a+b=3 and when R is phenyl, a is 1, b. CH₂=CH(CH₃) COOCH₂CH(OH)CH₂A, which is different from the other acrylic or methacrylic monomers in the adhesive, wherein A is one of:

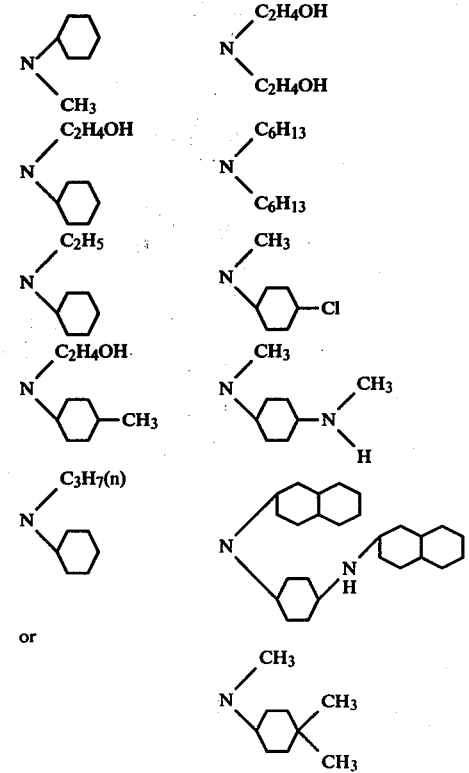

c. homopolymers of the compounds of (b),
d. a copolymer of at least 25% by weight of a compound of (b) with a member selected from the group consisting of methyl methacrylate, methyl acrylate, 2-ethyl hexyl acrylate, or butyl acrylate, e. the reaction products of epoxy polymers with secondary amines selected from the group consisting of N-methyl aniline, N-methyl-p-toluidine, N-β-hydroxy ethyl aniline, N-ethyl aniline, N-n-propyl aniline, N-β-hydroxy ethyl-p-toluidine, diethanol amine, dihexyl amine, p-chloro-N-methylaniline, N,N'-dimethyl-p-phenylene diamine, N,N'-di-2-naphthyl-p-phenylene diamine and N-methyl-3,5-xylidene wherein from 0.25 to one amino equivalent weight is reacted with one oxirane equivalent weight.

2. The adhesive of claim 1 wherein the activator has the formula

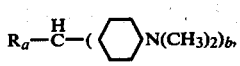

R = H or phenyl, a=0 or 1, a+b=3 and when R is phenyl a = 1.

3. The adhesive of claim 1 wherein the activator is CH$_2$=CH(CH$_3$) COOCH$_2$CH(OH)CH$_2$A, which is different from the other acrylic or methacrylic monomers in the adhesive, wherein A is one of:

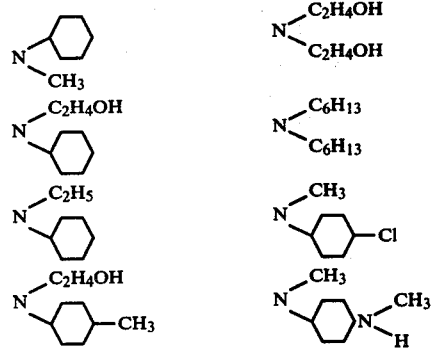

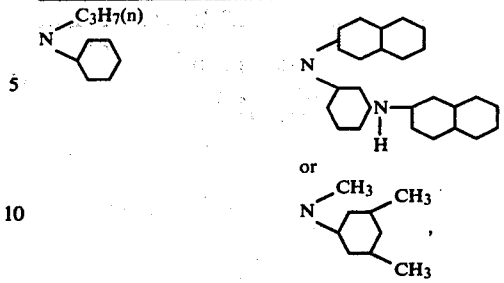

4. The adhesive of claim 1 wherein the activator is an elastomeric copolymer of at least 25% by weight of N-phenyl-N-methyl-amino-2-hydroxy propyl methacrylate, and a member of the group selected from methyl acrylate, 2-ethyl hexyl acrylate or butyl acrylate.

5. The adhesive of claim 1 wherein the activator is a co-polymer of at least 25% by weight of N-phenyl-N-methyl-amino-2-hydroxy propyl methacrylate, and methyl methacrylate.

6. The adhesive of claim 1 wherein the activator is a reaction product of N methylaniline with an epoxy polymer, formed by reacting from 0.25 mole to one mole of N-methyl aniline with one oxirane equivalent weight.

7. The adhesive of claim 1 wherein the said activator compound is encapsulated in pressure-rupturable microspheres having a shell composition insoluble in the activatable adhesive composition for a relatively long time period and the said microspheres are dispersed in the said adhesive composition.

8. The adhesive of claim 1 wherein the activator is N-phenyl-N-methyl-amino-2-hydroxy propyl methacrylate.

9. The adhesive of claim 1 wherein the activator is 4,4'methylene bis (N,N-dimethylaniline).

10. The adhesive of claim 1 wherein the activator is 4,4,4''methylene tris (N,N dimethylaniline).

11. The adhesive of claim 1 wherein the activator is p,p'-benzylidene bis (N-N-dimethylaniline).

* * * * *